United States Patent
Takada et al.

(10) Patent No.: US 11,278,940 B2
(45) Date of Patent: Mar. 22, 2022

(54) COMPRESSED FLUID DISCHARGE CONTROL DEVICE

(71) Applicant: SMC CORPORATION, Chiyoda-ku (JP)

(72) Inventors: Yoshiyuki Takada, Ichikawa (JP); Yoshitada Doi, Koshigaya (JP); Masayuki Oshima, Tsukuba (JP); Hiroaki Sasaki, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 29 days.

(21) Appl. No.: 16/755,188

(22) PCT Filed: Oct. 1, 2018

(86) PCT No.: PCT/JP2018/036637
§ 371 (c)(1),
(2) Date: Apr. 10, 2020

(87) PCT Pub. No.: WO2019/073834
PCT Pub. Date: Apr. 18, 2019

(65) Prior Publication Data
US 2021/0252561 A1    Aug. 19, 2021

(30) Foreign Application Priority Data

Oct. 13, 2017 (JP) .............................. JP2017-199885
Mar. 15, 2018 (JP) .............................. JP2018-048045

(51) Int. Cl.
*F16K 31/385* (2006.01)
*B08B 5/02* (2006.01)
(Continued)

(52) U.S. Cl.
CPC .............. *B08B 5/02* (2013.01); *F16K 31/385* (2013.01); *B05B 1/3006* (2013.01); *B05B 1/306* (2013.01); *B05B 12/002* (2013.01)

(58) Field of Classification Search
CPC ....... B05B 1/005; B05B 1/306; B05B 12/002; B05B 1/3006; F16K 31/385; B08B 5/02
See application file for complete search history.

(56) References Cited

U.S. PATENT DOCUMENTS 3,235,185 A * 2/1966 Enssle ................... B05B 7/1263
                                                          239/411
4,055,870 A * 11/1977 Furutsutsumi ............ A47L 5/14
                                                          15/409
(Continued)

FOREIGN PATENT DOCUMENTS

CN         201090776 Y      7/2008
CN         103925390 A      7/2014
(Continued)

OTHER PUBLICATIONS

International Search Report dated Nov. 6, 2018 in PCT/JP2018/036637 filed on Oct. 1, 2018, 2 pages.
(Continued)

*Primary Examiner* — Umashankar Venkatesan
(74) *Attorney, Agent, or Firm* — Oblon, McClelland, Maier & Neustadt, L.L.P.

(57) ABSTRACT

A compressed fluid discharge control device is provided with a diaphragm valve. When an opening/closing operation member is operated, a pilot chamber opening/closing valve opens to open a pilot chamber. As a result, pressure within a valve chamber becomes higher than that in the pilot chamber and the diaphragm valve separates from a valve seat. Then, compressed fluid previously accumulated in a holding chamber flows into a discharge passage through the
(Continued)

valve chamber and is discharged from the discharge opening of the discharge passage.

9 Claims, 11 Drawing Sheets

(51) Int. Cl.
    *B05B 1/30*     (2006.01)
    *B05B 12/00*     (2018.01)

(56) References Cited

U.S. PATENT DOCUMENTS

| | | | | |
|---|---|---|---|---|
| 5,113,888 | A | * | 5/1992 | Beggs .................. A01G 25/167 137/1 |
| 2003/0189111 | A1 | * | 10/2003 | Heren ................. F16K 31/3855 239/570 |
| 2008/0029722 | A1 | * | 2/2008 | Irwin .................... F16K 47/023 251/45 |
| 2015/0107704 | A1 | | 4/2015 | Shishido |

FOREIGN PATENT DOCUMENTS

| | | |
|---|---|---|
| JP | 10-132137 A | 5/1998 |
| JP | 10-165844 A | 6/1998 |
| JP | 2005-246356 A | 9/2005 |
| JP | 2009-275747 A | 11/2009 |
| JP | 2014-83518 A | 5/2014 |
| JP | 6179510 B2 | 8/2017 |

OTHER PUBLICATIONS

Combined Chinese Office Action and Search Report dated Dec. 23, 2020 in Patent Application No. 201880066574.5 (with partial English language translation and English translation of Category of Cited Documents), 10 pages.

Notification of Reason for Refusal dated Jul. 19, 2021 in Korean Patent Application No. 10-2020-7013426 (with English machine translation), 10 pages.

* cited by examiner

COMPRESSED FLUID DISCHARGE CONTROL DEVICE

TECHNICAL FIELD

The present invention relates to a compressed fluid discharge control device for controlling discharge of a compressed fluid.

BACKGROUND ART

In machining, a cutting powder of metal is generated and attaches to a surface of a workpiece. In order to remove this cutting powder to clean the surface of the workpiece, blasting of a compressed fluid (mainly, compressed air) is widely implemented. As a compressed fluid discharge control device for performing such blasting (blow), there may be cited a gun-shaped device of the kind disclosed in, for example, Japanese Laid-Open Patent Publication No. 2005-246356 and Japanese Laid-Open Patent Publication No. 2014-083518. Although this kind of gun-shaped compressed fluid discharge control device is also sometimes referred to as the likes of an "air blow gun", a "fluid blow gun", or a "discharge gun", it will be written below as an "air blow gun".

As described in Japanese Laid-Open Patent Publication No. 2005-246356, the air-blow gun includes: a housing including a handle to be gripped by an operator; and a lever provided to the housing in a manner enabling the lever to pivotally move relative to the housing. By the operator pressing the lever toward the handle by their fingers, an opening and closing valve that is interposed between a supply path and a discharge path, which are formed in the handle, opens, and the supply path and the discharge path communicate with each other. As a result, compressed air that has been supplied to the supply path from a compressed air supply source flows through the discharge path, and is then discharged from an opening (a discharge port) of the discharge path.

Note that, as described in Japanese Laid-Open Patent Publication No. 2014-083518, removal efficiency of cutting powder, dust, and so on, is known to be greater by the compressed air being discharge intermittently than by it being discharged continuously. Accordingly, a supply tube connected to the handle in order to supply compressed air to the supply path is provided with a solenoid valve, and the solenoid valve is opened and closed every certain time.

SUMMARY OF INVENTION

In the air blow gun, a pivotal movement speed of the lever differs according to magnitude of a force with which the lever is gripped by the operator. That is, the smaller the force with which the lever is gripped is, the smaller the pivotal movement speed becomes, and, as a result, the smaller a discharge flow rate of compressed air immediately after the supply path and the discharge path have communicated becomes, and, consequently, the smaller a discharge pressure becomes. In this case, it is not easy for sufficient removal efficiency to be obtained.

The present invention has been made in order to solve the above-described problem, and has an object of providing a compressed fluid discharge control device that excels in removal efficiency, and, moreover, enables complicated operation to be omitted.

In order to achieve the aforementioned object, the present invention provides a compressed fluid discharge control device for controlling discharge of a compressed fluid, the compressed fluid discharge control device having formed therein a valve chamber, the valve chamber being interposed between a supply path configured to supply the compressed fluid and a discharge path having a discharge port configured to discharge the compressed fluid, the valve chamber being provided with a valve seat, the compressed fluid discharge control device including:

a diaphragm valve configured to, by seating on or separating from the valve seat, block or establish communication between the supply path and the discharge path, the diaphragm valve including a pilot passage formed therein;

a pilot chamber opening and closing valve configured to open or close a pilot chamber into which the compressed fluid is introduced via the pilot passage from the supply path; and an opening and closing operation member configured to open and close the pilot chamber opening and closing valve, wherein, by the pilot chamber opening and closing valve being opened to thereby open the pilot chamber, the diaphragm valve separates from the valve seat to thereby establish communication between the supply path and the discharge path, and when the pilot chamber opening and closing valve is closed, or when supply of the compressed fluid from the supply path is stopped, the diaphragm valve seats on the valve seat to thereby close the pilot chamber and then communication between the supply path and the discharge path is blocked.

In the present invention, as the pilot chamber is opened and the compressed fluid in the pilot chamber is thereby released, the diaphragm valve opens. Hence, a quick response speed is obtained. At this time, the compressed fluid that has reached the valve chamber flows into the discharge path at one burst, and is discharged from an opened end (the discharge port) of the discharge path. Therefore, a high discharge pressure (a peak pressure) is obtained instantaneously immediately after start of discharge, regardless of magnitude of operating speed of the opening and closing operation member.

Note that by setting a stroke of the diaphragm valve small, the response speed can be made even quicker. That is, the peak pressure can be obtained immediately after the opening and closing operation member has been operated by the operator.

Moreover, discharge is started by a simple operation of the operator gripping the lever. That is, a complicated operation is never required to obtain the peak pressure either.

Moreover, by the compressed fluid of high discharge pressure being instantaneously discharged, it becomes easy for an object that is at rest to transition to a motion state, for example. Therefore, removal efficiency of cutting powder or dust, and so on, is improved. Moreover, since there is no need for a large quantity of the compressed fluid to be discharged in order to obtain the peak pressure, a reduction in used amount of the compressed fluid, and consequently, an energy saving, can be achieved.

A storage chamber configured to store the compressed fluid is preferably provided between the supply path and the valve chamber. In this case, the compressed fluid stored in advance in the storage chamber flows into the discharge path at one burst as the diaphragm valve opens. Hence, an even larger discharge pressure can be easily obtained. Of course, in this case, removal efficiency of cutting powder or dust, and so on, is further improved.

When the storage chamber is provided, the storage chamber should be configured as a variable capacity type inner chamber capable of having its capacity changed. This makes it possible to set an upper limit of the discharge pressure (the peak pressure) of the compressed fluid according to an intended use.

Moreover, when the storage chamber is provided, there is preferably provided a flow rate adjusting valve that adjusts a flow rate of the compressed fluid that is introduced into the storage chamber from the supply path.

In this case, for example, by tightening the flow rate adjusting valve, the flow rate at which the compressed fluid is introduced into the storage chamber can be set small. When the diaphragm valve opens uninterruptedly after discharge at high discharge pressure has ended, the compressed fluid passes through the storage chamber to reach the discharge path, and is discharged at low pressure. That is, blowing at low pressure can be continued.

Generally, dynamic frictional force of an object in a motion state is smaller compared to static frictional force of the object at rest. Therefore, even if cutting powder or dust which has been brought into a motion state by application of a high discharge pressure has a low discharge pressure applied thereto, the cutting powder or dust can be maintained in the motion state. Hence, removal of such foreign material can be continuously performed.

Alternatively, a configuration may be adopted so as to provide a flow rate changing valve that includes a valve section for changing an opening degree of the supply path, and that changes an inflow rate of the compressed fluid to the storage chamber by the valve section. In this case, by appropriately changing the flow rate of the compressed fluid that is introduced into the storage chamber, it becomes possible to adjust the discharge pressure at the low discharge pressure after discharge at the high discharge pressure has ended, to a desired pressure.

The compressed fluid discharge control device may include a housing that has formed therein the valve chamber, the pilot chamber, and the discharge path, and that is provided with the diaphragm valve and the pilot chamber opening and closing valve. A gun shape may be cited as an example of a shape of the housing. Moreover, an easy-to-operate lever is preferably adopted as the opening and closing operation member.

Furthermore, the pilot chamber opening and closing valve preferably establishes or blocks communication between the pilot chamber and the discharge path. In this case, when the pilot chamber is opened, the compressed fluid in the pilot chamber flows into the discharge path. That is, the compressed fluid in the pilot chamber also is discharged and thus can be employed in removal of dust, and so on. Hence, the peak pressure immediately after start of discharge becomes even larger, and, moreover, yet more energy saving can be achieved.

In order to open and close the pilot chamber opening and closing valve, there should be provided, for example: a pressing member configured to press the pilot chamber opening and closing valve in an opening direction when the opening and closing operation member has been operated; and an elastic member configured to elastically bias the pressing member in a closing direction of the pilot chamber opening and closing valve.

In the above configuration, an arrangement is preferably adopted whereby there is provided an abutting member configured to be displaceable relative to the diaphragm valve, and whereby, by this abutting member abutting on the diaphragm valve, displacement of the diaphragm valve is restricted. That is, a displacement amount restricting unit may be provided.

In this case, when the abutting member abuts on a valve main body, further displacement of the valve main body is prevented. A time point when this displacement stops is determined as a maximum opening degree of the diaphragm valve. As a result, the maximum opening degree of the diaphragm valve can be made smaller than a design maximum opening degree corresponding to a case where the abutting member is arranged so as not to abut on the valve main body. Accordingly, the flow rate of pressurized fluid flowing from the diaphragm valve becomes smaller than a design flow rate. Thus, an excessive amount of the pressurized fluid can be prevented from being discharged.

Moreover, by changing a position of the abutting member, a stopping position of the valve main body can be changed. That is, the maximum opening degree of the diaphragm valve can be changed as desired. By exactly adjusting the position of the abutting member, the maximum opening degree of the diaphragm valve, and thus the flow rate and peak pressure of the pressurized fluid led out from the diaphragm valve can be precisely regulated.

In this case, there is preferably provided a lock unit configured to position and fix the abutting member. This is because by the abutting member being positioned and fixed, the maximum opening degree of the diaphragm valve becomes constant, and the flow rate of the pressurized fluid at this time stabilizes. Moreover, due to the lock unit, it becomes impossible for the operator to easily adjust the opening degree. Therefore, discharge of more than a required amount pre-set by an administrator can be prevented.

In the present invention, a configuration is adopted whereby, by the pilot chamber being opened (the compressed fluid in the pilot chamber being released), the diaphragm valve provided between the supply path and the discharge path opens. At this time, the compressed fluid that has accumulated in the valve chamber flows into the discharge path at one burst, and is discharged from the discharge port, so that the high discharge pressure (the peak pressure) is obtained instantaneously immediately after start of discharge, regardless of magnitude of operating speed of the opening and closing operation member. Therefore, since there is no need for discharging a large quantity of the compressed fluid in order to obtain the high discharge pressure, a reduction in used amount of the compressed fluid, and consequently, an energy saving can be achieved.

Moreover, since the diaphragm valve opens quickly with opening of the pilot chamber, the compressed fluid instantaneously flows at a large flow rate. Therefore, by a simple operation of operating the opening and closing operation member, the peak pressure can be easily obtained immediately thereafter. Moreover, response speed is excellent. Note that by setting the stroke of the diaphragm valve small, the response speed can be made even quicker.

Moreover, due to the compressed fluid of high discharge pressure being instantaneously discharged, a large force acts on an object that is at rest, for example. It therefore becomes easy for the object to transition to the motion state. When the object is cutting powder or dust, and so on, removal efficiency of the foreign material is improved.

DESCRIPTION OF EMBODIMENTS

Preferred embodiments of a compressed fluid discharge control device according to the present invention, exemplifying the case of using compressed air as the compressed fluid, will be presented and described in detail below with reference to the accompanying drawings. Note that although "left", "right", "down", and "up" in the following descriptions correspond to leftward, rightward, downward, and upward in FIGS. 1 to 3 and 8 to 11, this is a matter of convenience for facilitating understanding, and does not limit an attitude when the compressed fluid discharge control device is actually used.

Figure 1:
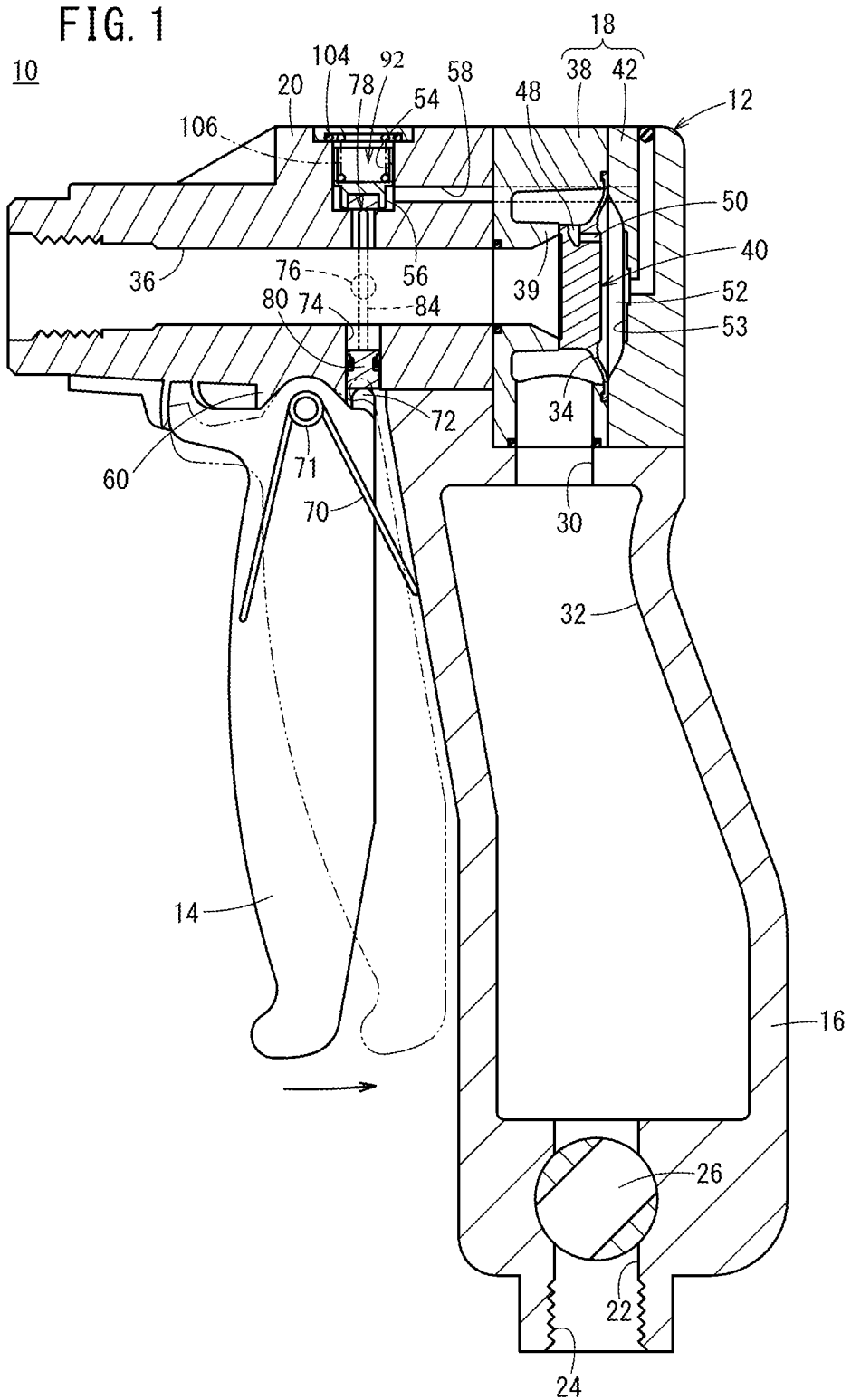
FIG. 1 is a schematic side cross-sectional view of main part of an air blow gun (a compressed fluid discharge control device) according to a first embodiment of the present invention.

FIG. 1 is a schematic side cross-sectional view of main part of an air blow gun 10 being the compressed fluid discharge control device according to a first embodiment. This air blow gun 10 includes: a housing 12 which is gun-shaped; and a lever 14 (an opening and closing operation member) attached to the housing 12 in a manner enabling the lever 14 to pivotally move or turn relative to the housing 12.

The housing 12 is configured including: a handle 16 to be gripped by an operator; a valve section 18; and a discharge section 20. A lower section of the handle 16 has formed therein a first supply path 22 for introducing compressed air that is supplied from a compressed air supply source and thereafter flows through a supply tube (neither of which are illustrated). An opening of the first supply path 22 is provided with a screw thread section 24 for connecting the supply tube. Moreover, the first supply path 22 has arranged therein a flow rate adjusting valve 26 that adjusts a flow rate of compressed air that flows through the first supply path 22.

The handle 16 is a hollow section, and has formed on its hollow inner side a storage chamber 32 which is wider compared to the first supply path 22 and a second supply path 30 and which has a large capacity. This storage chamber 32 is interposed between the first supply path 22 and the second supply path 30. That is, compressed air that has flowed through the first supply path 22 is temporarily stored in the storage chamber 32, then passes along the second supply path 30 extending from the handle 16 to the valve section 18, and is delivered to the valve section 18.

By changing the handle 16 to thereby changing the capacity of the storage chamber 32 appropriately, it is possible to set an upper limit of a peak pressure according to an application. That is, compressed air is prevented from being discharged at an excessively high pressure. In other words, the storage chamber 32 is provided as a variable capacity type inner chamber capable of having its capacity changed. The same applies also in later-mentioned second through fourth embodiments.

Figure 2:
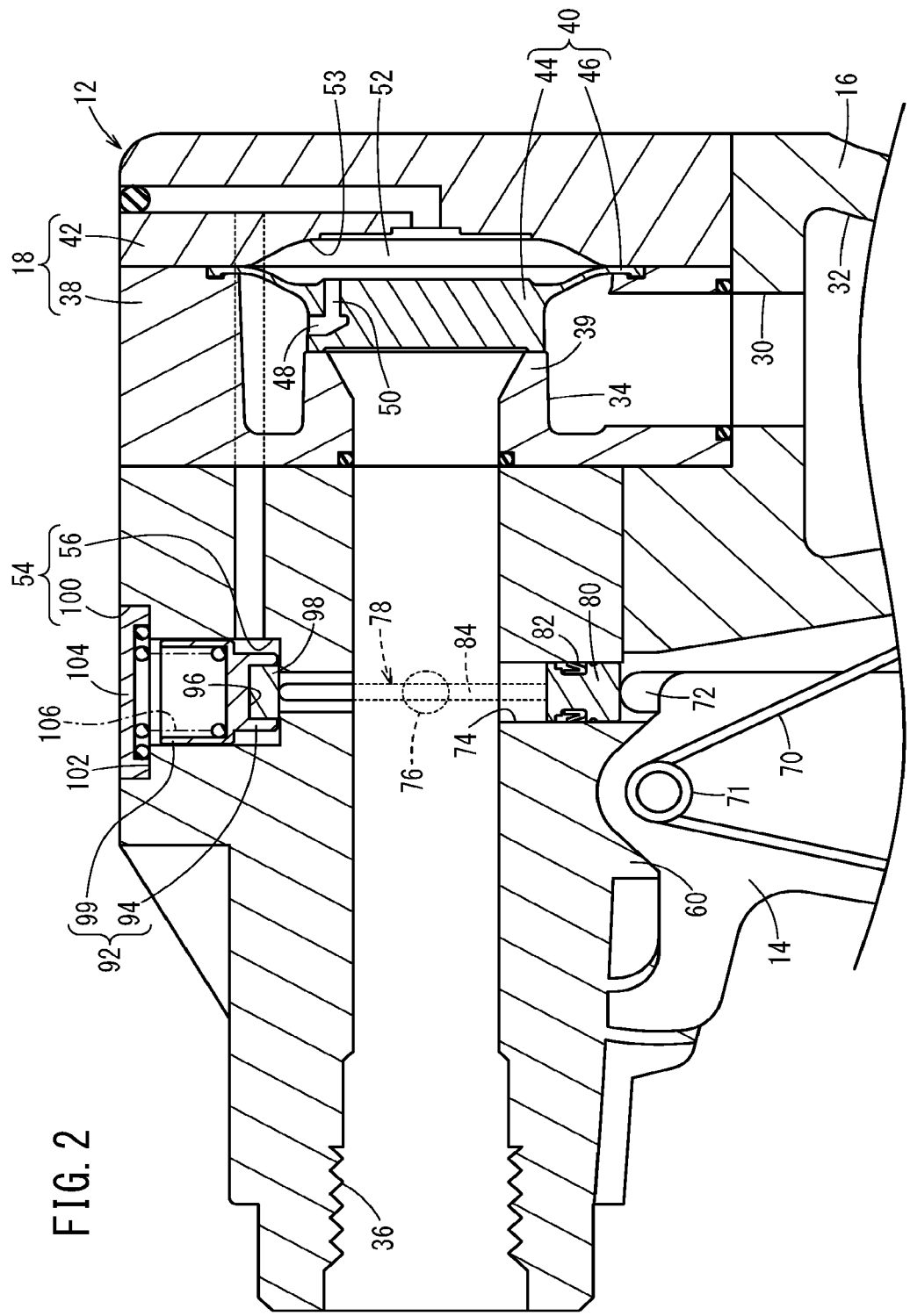
FIG. 2 is an enlarged side cross-sectional view of main part of the air blow gun of FIG. 1.

As shown in detail in FIG. 2, the valve section 18 includes a first holder member 38 that has formed therein a part of the second supply path 30, a circling valve chamber 34, and a part of a discharge path 36. That is, the valve chamber 34 is interposed between the second supply path 30 and the discharge path 36, and communicates with both flow paths 30, 36. In addition, an opening of the discharge path 36 that is positioned closer to the valve chamber 34 is provided with a valve seat 39 that projects in an annular shape.

The valve section 18 further includes a second holder member 42 that, together with this first holder member 38, sandwiches and holds a diaphragm valve 40. That is, the diaphragm valve 40 includes: a valve main body 44 which is thick; and a flange section 46 which is thinner and of larger diameter compared to the valve main body 44. By an outer circumferential edge section of the flange section 46 being sandwiched between the first holder member 38 and the second holder member 42, the diaphragm valve 40 is held by the first holder member 38 and the second holder member 42.

The valve main body 44, which has a substantially circular columnar shape, of the diaphragm valve 40 has formed therein: a short longitudinal hole 48 extending from a side wall section of the valve main body 44 along a diameter; and a lateral hole 50 linked substantially orthogonally to the longitudinal hole 48 and extending toward the second holder member 42. Due to the longitudinal hole 48 and lateral hole 50, the valve chamber 34 and a pilot chamber 52 (mentioned later) communicate with each other. That is, the longitudinal hole 48 and the lateral hole 50 form a first pilot passage for introducing compressed air into the pilot chamber 52.

The second holder member 42 has a recess 53 formed in an end surface thereof that faces the diaphragm valve 40. The pilot chamber 52 is formed by this recess 53 and an end surface of the diaphragm valve 40 that faces the second holder member 42. A second pilot passage 58 that extends to a vicinity of a bottom section of a later-mentioned valve housing hole 54 (a small hole 56) is connected to the pilot chamber 52.

The discharge section 20 has the long discharge path 36 formed therein. One end of the discharge path 36 is a discharge port opened to the atmosphere. Note that a configuration may be adopted whereby a certain member such as a nozzle or diffuser (neither of which is illustrated) is attached to the discharge port.

The lever 14 is attached, via a screw-for-pivoting, to two thin attachment tab sections 60 of the discharge section 20 downwardly projecting. That is, the two attachment tab sections 60 have insertions holes formed therein, and the screw-for-pivoting is passed through these insertion holes. Of course, a nut serving as a retainer of the screw-for-pivoting is screwed onto screw thread sections projecting from the insertion holes, of the screw-for-pivoting. Note that none of the screw-for-pivoting, the insertion holes, the screw thread sections, and the nut are illustrated.

The lever 14 is a hollow body, and has arranged on its inside a V-shaped spring 70 whose one end abuts on an inner wall of the lever 14, and whose other end abuts on an outer wall of the handle 16. A trunk section of the screw-for-pivoting is passed through a spirally circling section 71 of the V-shaped spring 70, whereby the V-shaped spring 70 is held by the screw-for-pivoting.

A pressing projection 72 is formed in a projecting manner on an upper end surface of the lever 14. The pressing projection 72 faces a lower opening of large inner diameter, of a piston sliding hole 74 formed in the discharge section 20. Note that the valve housing hole 54 is connected to an upper opening of small inner diameter, of the piston sliding hole 74. This piston sliding hole 74 is positioned on a far side of a paper surface in FIG. 1, with respect to the discharge path 36. A communicating path 76 extending in a direction orthogonal to the paper surface in FIG. 1 is formed from the discharge path 36 to the piston sliding hole 74.

A pressing rod 78 (a pressing member) is housed, in a displaceable manner, in a large diameter lower inside of the piston sliding hole 74. A piston section 80 of large diameter facing the lower opening of the piston sliding hole 74, of the pressing rod 78 is fitted with a seal member 82, whereby the piston sliding hole 74 is sealed.

A rod section 84 of the pressing rod 78 is housed in a small-diameter upper side of the piston sliding hole 74 so as to be separated from an inner wall of the piston sliding hole 74. Furthermore, an engagement hole 96 provided in a small diameter thick section 94 of a poppet valve 92 (a pilot chamber opening and closing valve) is engaged with a blocking seal 98 on which a tip of the rod section 84 abuts and that is wider compared to the upper opening of the piston sliding hole 74.

The poppet valve 92 includes: the small diameter thick section 94; and an annular projection 99 of large diameter. On the other hand, the valve housing hole 54 is formed as a stepped hole configured from: the small hole 56 of small inner diameter; and a large hole 100 of large inner diameter, and, of these, the small hole 56 has substantially the whole of the poppet valve 92 housed therein. As described above, the second pilot passage 58 that extends from the recess 53 is connected to the vicinity of the bottom section of the small hole 56.

Furthermore, a cap member 104 covering an opening above the annular projection 99 is positioned and fixed in a step section 102 formed between the small hole 56 and the large hole 100. This cap member 104 prevents the poppet valve 92 from dropping out of the valve housing hole 54.

A coil spring 106 as an elastic member is housed inside the annular projection 99. A lower end of this coil spring 106 abuts on a bottom surface of the annular projection 99, and its upper end abuts on a lower end surface of the cap member 104. Therefore, the coil spring 106 elastically biases the poppet valve 92 toward the lever 14. Due to this elastic biasing, the blocking seal 98 seats on a vicinity of the upper opening of the piston sliding hole 74. That is, the upper opening of the piston sliding hole 74 is closed and blocked by the blocking seal 98.

The air blow gun 10 according to the first embodiment, which is basically configured as above, will next have its operational advantages described.

Compressed air is delivered to the first supply path 22 via the supply tube from the compressed air supply source, and is introduced into the storage chamber 32 from the first supply path 22. When the storage chamber 32 is filled with compressed air, the compressed air passes through the second supply path 30, the valve chamber 34, and the longitudinal hole 48 and lateral hole 50 formed in the diaphragm valve 40 (the first pilot passage) and flows through the pilot chamber 52. The compressed air further passes through the second pilot passage 58 and is then introduced into the valve housing hole 54 (the small hole 56). Since the valve housing hole 54 is blocked by the cap member 104, and the blocking seal 98 blocks the upper opening of the piston sliding hole 74, further flowing of the compressed air is prevented.

In this state, internal pressure of compressed air in the valve chamber 34, and internal pressure of compressed air in the pilot chamber 52 are in balance. Hence, the diaphragm valve 40 maintains a state of its valve main body 44 being seated on the valve seat 39. That is, the diaphragm valve 40 is closed, and, as a result, communication of the discharge path 36 with the first supply path 22, storage chamber 32, and second supply path 30, is blocked.

When performing cleaning work, or the like, by air blow, the operator grips the handle 16 and the lever 14 so that the handle 16 is covered by their palm and the lever 14 is covered by their fingers, and, next, pivotally moves the lever 14 with the screw-for-pivoting serving as a pivot, so that a lower end of the lever 14 approaches the handle 16. At this time, the V-shaped spring 70 is compressed, and the pressing projection 72 formed projecting on the upper end surface of the lever 14 presses a lower portion of the piston section 80 of the pressing rod 78.

Figure 3:
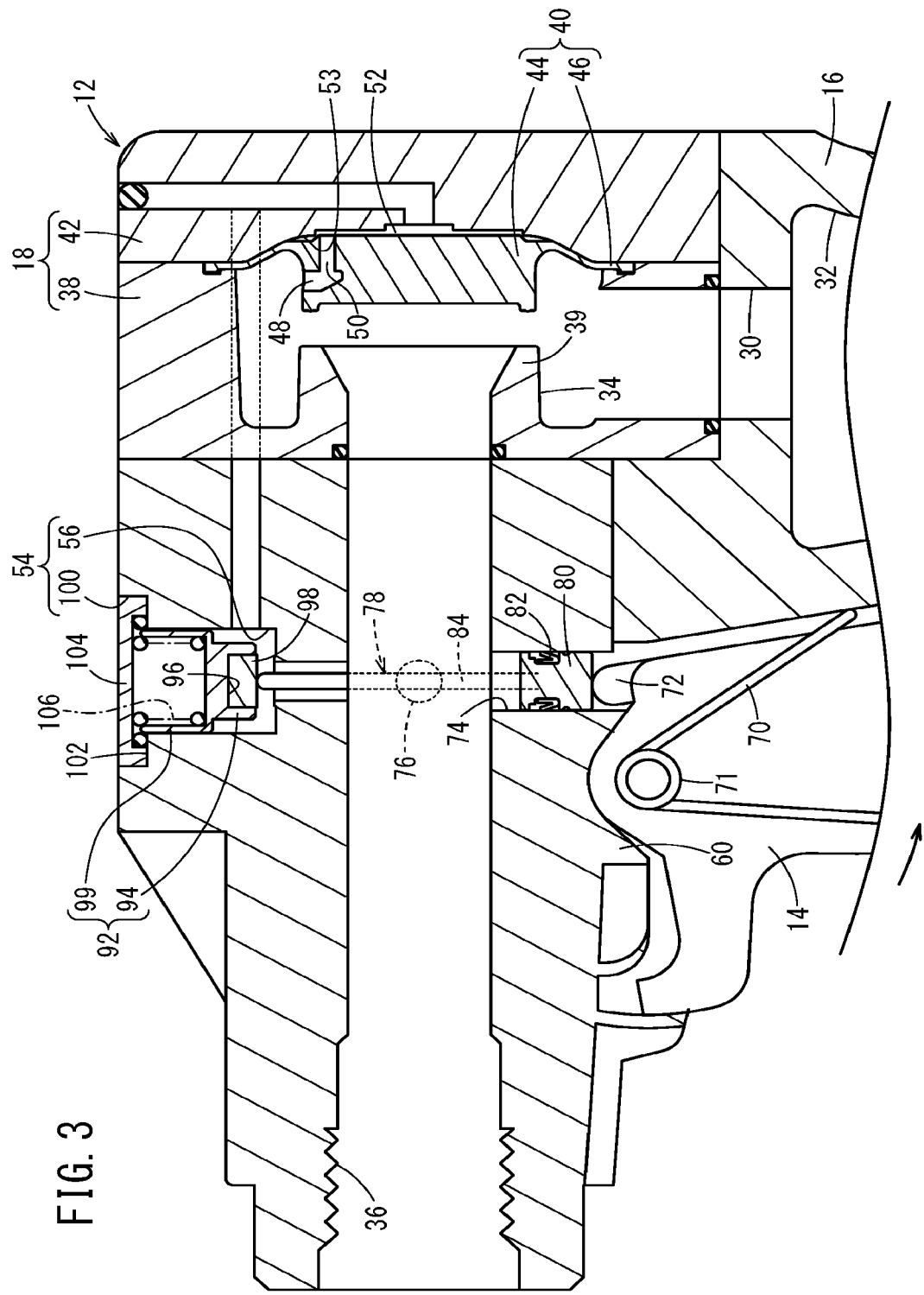
FIG. 3 is an enlarged side cross-sectional view of main part showing a state where a diaphragm valve configuring the air blow gun of FIG. 1 has opened, so that a supply path and a storage chamber have communicated with a discharge path.

As shown in FIG. 3, the pressing rod 78 whose piston section 80 has been pressed moves upward along the inside of the piston sliding hole 74 while the piston section 80 being in sliding contact with the piston sliding hole 74. Therefore, its rod section 84 rises, and the poppet valve 92 rises integrally therewith. Since the annular projection 99 of the poppet valve 92 is covered by the cap member 104, the poppet valve 92 is prevented from coming off from the small hole 56, and the coil spring 106 contracts.

Due to this rise, the blocking seal 98 separates from the piston sliding hole 74. That is, the piston sliding hole 74 opens. Therefore, the second pilot passage 58 communicates with the piston sliding hole 74 via the small hole 56.

Now, the piston sliding hole 74 and the discharge path 36 communicate with each other via the communicating path 76. Hence, when the rod section 84 moves upward, the second pilot passage 58 is brought into communication with the discharge path 36 via the small hole 56, the piston sliding hole 74, and the communicating path 76. Therefore, compressed air in the second pilot passage 58 and the pilot chamber 52 flows into the discharge path 36, and is discharged from the discharge port. Thus, by the poppet valve 92 being opened, the pilot chamber 52 opens.

When the compressed air in the pilot chamber 52 is released as described above, the internal pressure in the pilot chamber 52 becomes smaller than the internal pressure in the valve chamber 34. Therefore, the valve main body 44 of the diaphragm valve 40 is pressed by the compressed air in the valve chamber 34, and, as a result, the valve main body 44 promptly separates from the valve seat 39. That is, the diaphragm valve 40 promptly opens. Thus, since the diaphragm valve 40 opens as the compressed air in the pilot chamber 52 is released, a quick response speed is obtained. Moreover, by setting a stroke of the diaphragm valve 40 at this time to be small, the response speed can be made even quicker.

Due to the diaphragm valve 40 opening, at least the storage chamber 32 and the second supply path 30 communicate with the discharge path 36. In the case where the flow rate adjusting valve 26 is not fully closed, the first supply path 22 also communicates with the discharge path 36.

The storage chamber 32 is pre-filled with a certain volume of compressed air. In other words, a certain volume of the compressed air is already stored in the storage chamber 32. Therefore, the compressed air in the storage chamber 32 is introduced into the discharge path 36 via the second supply path 30 and the valve chamber 34, and merges with compressed air that has been delivered to the discharge path 36 as described above from the pilot chamber 52. Hence, a large flow amount of compressed air is discharged at one burst from the discharge port. Therefore, as shown by the solid line in FIG. 4, a high discharge pressure (the peak pressure) is obtained instantaneously immediately after start of discharge (blow). Now, by appropriately changing the capacity of the storage chamber 32, it is possible to set the upper limit of the peak pressure depending on an intended use. That is, it is possible to prevent compressed air from being discharged at an excessively high pressure.

Figure 4:
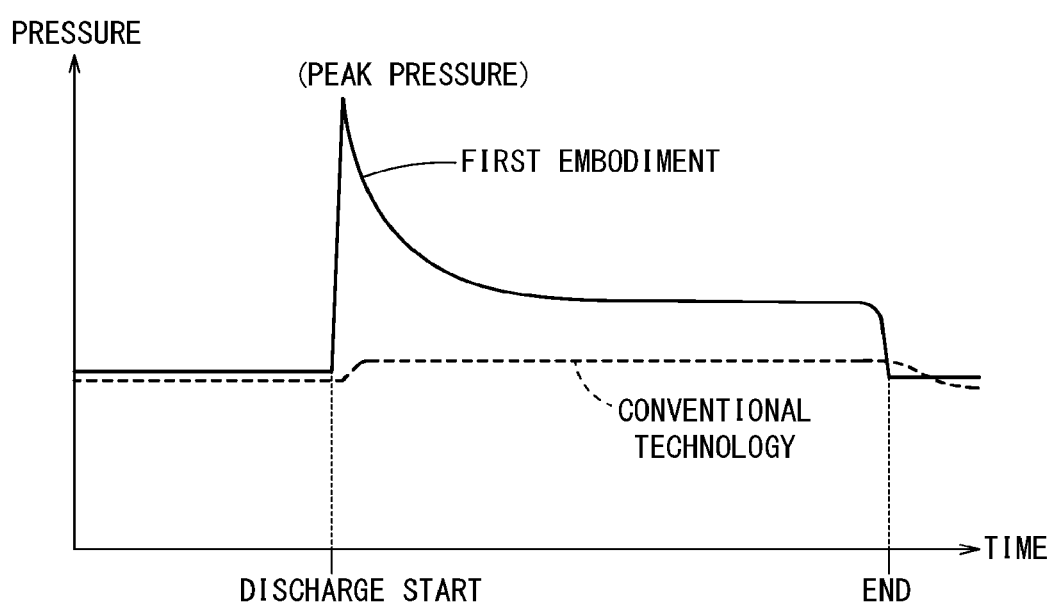
FIG. 4 is a graph showing change-with-time of discharge pressure.

In FIG. 4, discharge pressure in an air blow gun according to conventional technology is shown by a broken line. From this FIG. 4, it may be understood that in the conventional technology, the discharge pressure is substantially constant from start to finish of discharge, whereas in the first embodiment, the peak pressure is obtained immediately after start of discharge. Thus, in the first embodiment, a configuration is adopted whereby the diaphragm valve 40 is opened by opening the pilot chamber 52, and, moreover, compressed air stored in the storage chamber 32 is discharged at one burst. Therefore, the peak pressure is easily obtained by a simple operation of pivotally moving the lever 14, regardless of magnitude of the force with which the lever 14 is gripped by the operator, in other words, regardless of a pivotally moving speed of the lever 14.

When the flow rate adjusting valve 26 is fully closed, communication of the first supply path 22 and the storage chamber 32 is blocked. Thus, even if a state of the lever 14 being pulled to a handle 16 side is maintained, blow ends as discharge of the compressed air in the storage chamber 32 ends. When performing blow again, the storage chamber 32 should be re-filled with compressed air by opening the flow rate adjusting valve 26.

On the other hand, when the flow rate adjusting valve 26 is opened with a certain opening degree, the first supply path 22 and the storage chamber 32 communicate with each other. Thus, compressed air is supplied via the first supply path 22 simultaneously with the compressed air in the storage chamber 32 being discharged. At this time point, the diaphragm valve 40 is open, so the compressed air flows through the inside of the storage chamber 32 without being stored in the storage chamber 32, and the compressed air passes along the second supply path 30 and the valve chamber 34 and then flows into the discharge path 36. Hence, discharge of compressed air is continued.

At this time, pressure (discharge pressure) of compressed air discharged from the discharge port is smaller compared to discharge pressure immediately after discharge. That is, as shown in FIG. 4, blow is continued at a constant low pressure. The discharge pressure at this time can be adjusted according to the opening degree of the flow rate adjusting valve 26. That is, the discharge pressure becomes larger as the opening degree of the flow rate adjusting valve 26 becomes larger.

Thus, in the first embodiment, a configuration is adopted whereby compressed air stored in the storage chamber 32 is first discharged to thereby increase the discharge pressure immediately after discharge (i.e., to obtain the peak pressure), and thereafter the discharge pressure is reduced. Generally, dynamic frictional force acting on an object in motion is smaller compared to static frictional force acting on the object at rest. Hence, even when the discharge pressure has been changed as described above, cutting powder or dust, and so on, can be shifted from a static state to a motion state by the peak pressure immediately after discharge, and the motion state of the cutting powder or dust, and so on, can be maintained by the subsequent low discharge pressure. Therefore, the cutting powder or dust, and so on, can be easily removed.

Moreover, discharge of a large flow rate of compressed air for the purpose of increasing the discharge pressure need only be performed for an extremely short time. That is, there is no need to continue discharging the compressed air at a large flow rate. Therefore, a used amount of the compressed air decreases, so an energy saving is achieved.

In addition, in the first embodiment, a configuration is adopted whereby compressed air in the pilot chamber 52 and the second pilot passage 58 is used in air blow as described above. Therefore, the peak pressure immediately after discharge can be made even larger, and by decreased consumption of compressed air, an even greater energy saving can be achieved.

To end blow, the operator just has to reduce their gripping force on the lever 14. When an elastic biasing force of the V-shaped spring 70 gets to exceed the gripping force, the lever 14 pivotally moves about the screw-for-pivoting serving as a pivot under elastic action of the V-shaped spring 70, and returns to its original position (refer to FIG. 1). Accordingly, the piston section 80 is released from pressing of the pressing projection 72 of the lever 14, and the coil spring 106 elastically biases the poppet valve 92. As a result, the poppet valve 92 and the pressing rod 78 descend, and the blocking seal 98 blocks the upper opening of the piston sliding hole 74 (refer to FIGS. 1 and 2).

That is, communication of the pilot chamber 52 and the discharge path 36 is blocked. Therefore, since internal pressure of the pilot chamber 52 becomes larger compared to internal pressure of the valve chamber 34, the valve main body 44 of the diaphragm valve 40 seats on the valve seat 39. That is, the diaphragm valve 40 closes, and communication of the first supply path 22, storage chamber 32, and second supply path 30, and the discharge path 36 is blocked.

Figure 5:
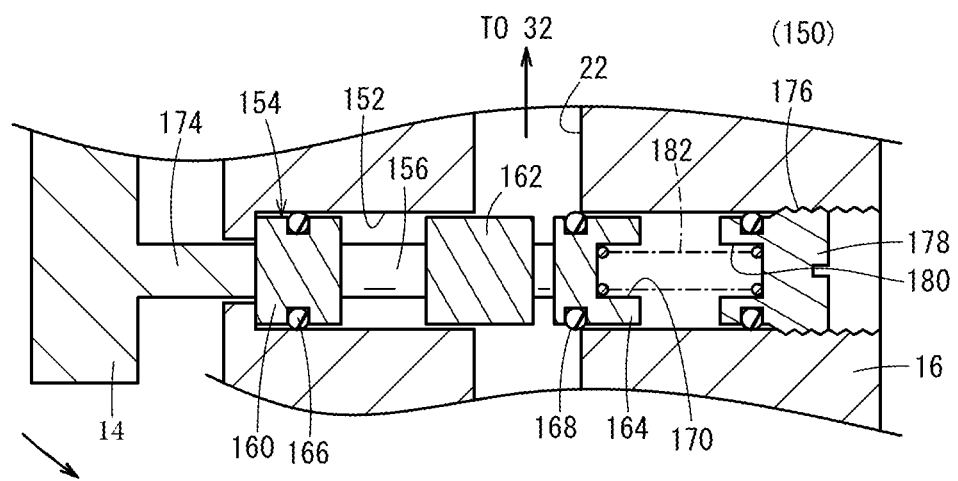
FIG. 5 is an enlarged side cross-sectional view of main part of an air blow gun (a compressed fluid discharge control device) according to a second embodiment of the present invention.

Next, an air blow gun 150 according to a second embodiment shown in FIG. 5 will be described. Note that constituent elements that are the same as constituent elements shown in FIGS. 1 to 3 will be assigned with the same reference symbols as in FIGS. 1 to 3, and detailed descriptions thereof will be omitted.

In this air blow gun 150, a valve sliding hole 152 extending in a direction substantially orthogonal to the first supply path 22 is formed in a lower section of the handle 16, and a spool 154 (a flow rate changing valve) is housed in a displaceable manner in the valve sliding hole 152. The spool 154 includes: a shaft section 156; and a first land section 160, second land section 162, and third land section 164 (each being a valve section) that are of larger diameter compared to the shaft section 156. The first land section 160 is closest to the lever 14, and the third land section 164 is most separated from the lever 14. Side circumferential walls of the first land section 160 and third land section 164, of these land sections are fitted with a first O-ring 166 and a second O-ring 168. These first O-ring 166 and second O-ring 168 contact an inner circumferential wall of the valve sliding hole 152, whereby the valve sliding hole 152 is sealed. Moreover, a first spring housing hole 170 is formed in the third land section 164.

One end of the valve sliding hole 152 is opened, and this opening has inserted therein a rod-shaped plunger section 174 of substantially circular columnar shape formed projecting in a lower section of the lever 14. The plunger section 174 abuts on one end surface of the first land section 160.

One end section of the valve sliding hole 152 that is remoter from the lever 14 has a spring receiving member 178 positioned and fixed therein via a screw thread section 176 provided in a side circumferential wall of the valve sliding hole 152. The spring receiving member 178 has a second spring housing hole 180 formed in an end surface thereof that faces the third land section 164. This second spring housing hole 180 and the first spring housing hole 170 house a return spring 182 that elastically biases the spool 154 toward the lever 14.

In this air blow gun 150, the second land section 162 is positioned at an intersection of the first supply path 22 and the valve sliding hole 152. When the lever 14 is not pivotally moved, the volume of a space where the second land section 162 occupies the intersection, in other words, a blocking amount at which the second land section 162 blocks the intersection, is minimum. That is, an opening degree of the intersection is maximum, and the compressed air that has been delivered to the first supply path 22 from the supply tube is stored in the storage chamber 32 (refer to FIG. 1) similarly to in the first embodiment.

When starting blow, the operator pulls the lever 14 toward the handle 16 similarly to as described above. As a result, in accordance with the first embodiment, the first supply path 22, storage chamber 32, and second supply path 30 communicate with the discharge path 36 via the valve chamber 34, and compressed air stored in the storage chamber 32 is first discharged.

Figure 6:
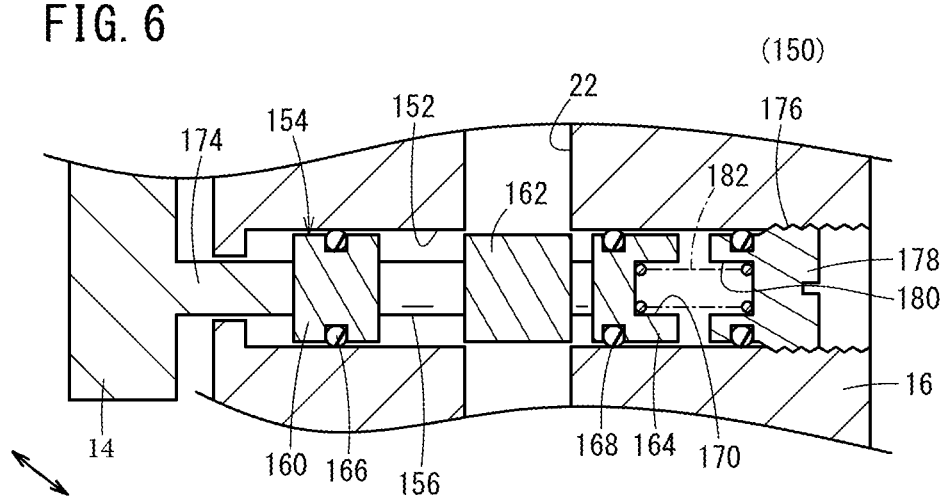
FIG. 6 is an enlarged side cross-sectional view of main part showing a state where a spool configuring the air blow gun of FIG. 5 has been displaced.

In the second embodiment, at this time, the plunger section 174 formed projecting on the lever 14 enters the valve sliding hole 152 to press the first land section 160. Hence, as shown in FIG. 6, the first land section 160 is displaced in a direction of separating from the lever 14 along an inside of the valve sliding hole 152, and the shaft section 156, the second land section 162, and the third land section 164 are displaced in the direction of separating from the lever 14, integrally with the first land section 160. At the same time, the return spring 182 is compressed.

By the second land section 162 being displaced in this way, the blocking amount of the intersection by the second land section 162 increases. As a result, the intersection is narrowed, so a flowing amount of compressed air from the first supply path 22 to the discharge path 36 decreases. Hence, after the instantaneous high discharge pressure (the peak pressure) has been obtained as described above, a low discharge pressure can be continuously obtained.

Figure 7:
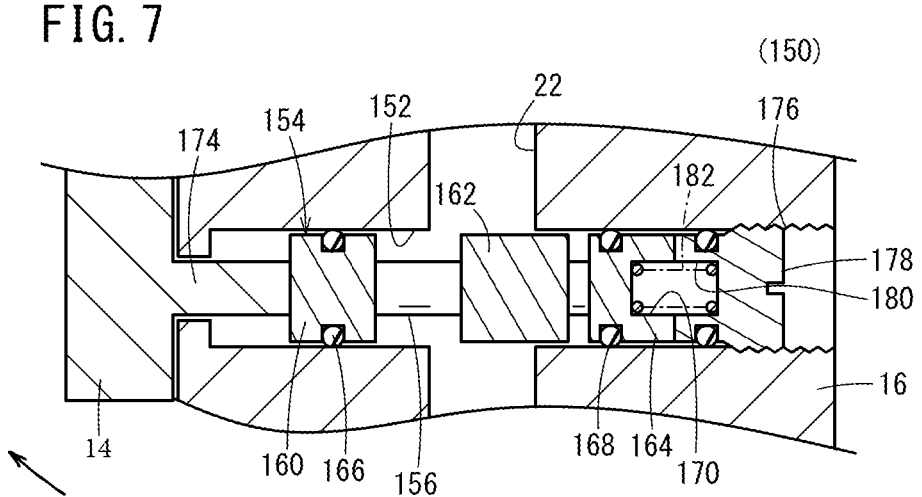
FIG. 7 is an enlarged side cross-sectional view of main part showing a state where the spool has been displaced to a position different from in FIG. 6.

FIG. 7 shows a state that a turning amount of the lever 14 (a plunging amount of the spool 154 by the plunger section 174) is maximum, and a displacement position of the spool 154 can be changed by the operator adjusting their gripping force. For example, if the blocking amount of the intersection by the second land section 162 increases, then the first supply path 22 is further narrowed. As a result, the flowing amount of compressed air from the first supply path 22 to the discharge path 36 further decreases, and the discharge pressure becomes even smaller.

Furthermore, by adjusting the turning amount of the lever 14, it is possible to fully close the intersection by the second land section 162, as shown in FIG. 6. In this case, compressed air ceases to be delivered to the storage chamber 32 from the first supply path 22, and thus after the peak pressure has been obtained, blow stops.

Thus, in the second embodiment, by the operator appropriately adjusting the turning amount of the lever 14 to adjust the displacement position of the spool 154, the discharge pressure generated when blow is continued after the peak pressure has been obtained can be freely changed. In some cases, it is possible to set the discharge pressure to zero (i.e., not continuing blow).

To end blow that is continued after the peak pressure has been obtained, the operator just has to further reduce their gripping force on the lever 14. As a result, the elastic biasing force of the V-shaped spring 70 (refer to FIG. 1) gets to exceed the gripping force, and the lever 14 pivotally turns about the screw-for-pivoting under elastic action of the V-shaped spring 70, and returns to its original position. In addition, the plunger section 174 retracts from the valve sliding hole 152, so that the spool 154 is released from pressing by the lever 14 (the plunger section 174). Hence, the return spring 182 extends, and the spool 154 returns to its original position (refer to FIG. 5).

At this time, the blocking amount of the intersection by the second land section 162 becomes minimum. That is, the opening degree of the intersection becomes maximum. Therefore, the storage chamber 32 is filled with a large flow amount of compressed air, so that the compressed air can be efficiently stored in the storage chamber 32.

Next, an air blow gun provided with a displacement amount restricting unit will be described as a third embodiment and a fourth embodiment. Note that constituent elements that are the same as constituent elements shown in FIGS. 1 to 7 will be assigned with the same reference symbols as in FIGS. 1 to 7, and detailed descriptions thereof will be omitted.

Figure 8:
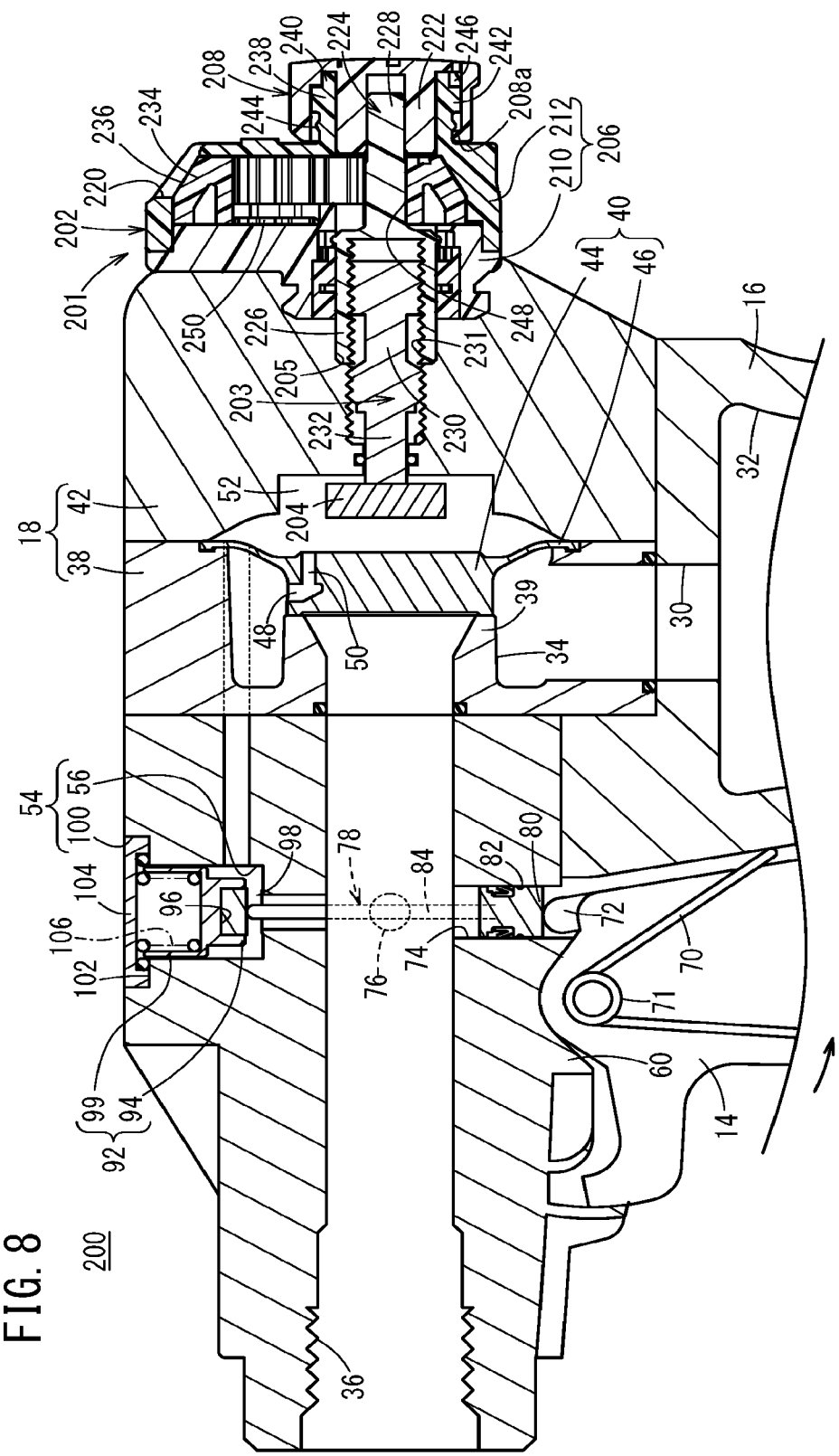
FIG. 8 is an enlarged side cross-sectional view of main part of an air blow gun (a compressed fluid discharge control device) according to a third embodiment of the present invention.
Figure 9:
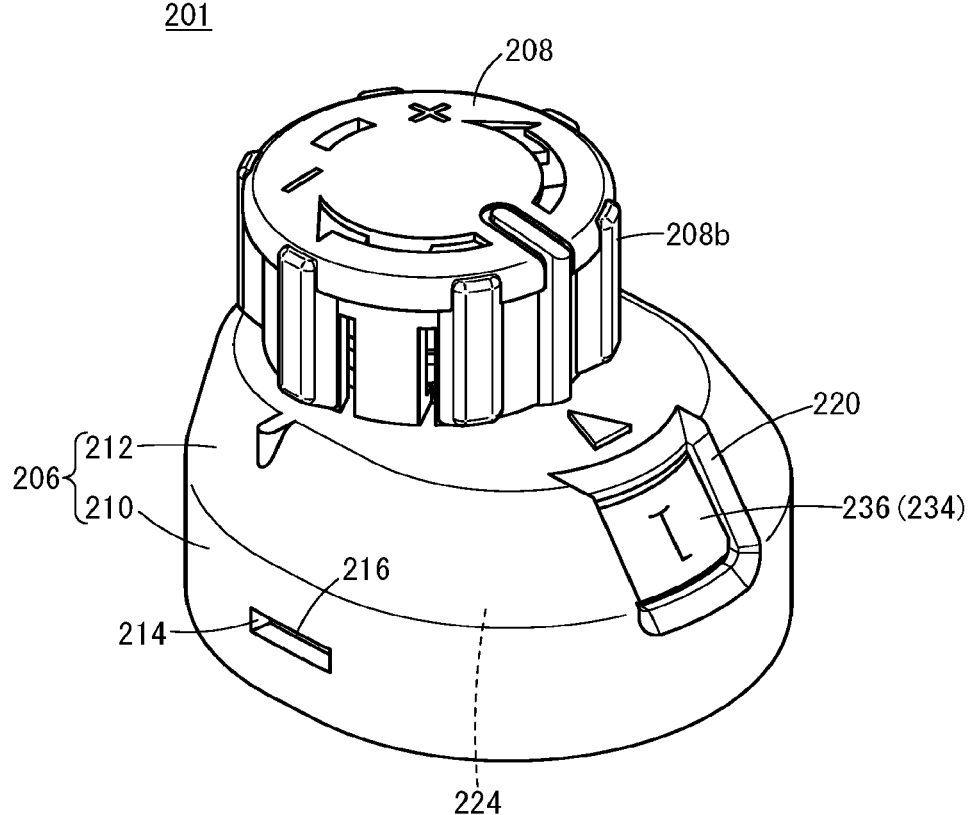
FIG. 9 is a schematic perspective view of a flow rate control device provided to the air blow gun of FIG. 8.

An air blow gun 200 according to a third embodiment shown in FIG. 8 includes a flow rate control device 201 being one example of the displacement amount restricting unit. Note that the flow rate control device 201 basically has a configuration the same as a configuration described in Japanese Patent No. 6179510, and hence an outline thereof will be described below.

The flow rate control device 201 mainly includes a flow rate adjustment display section 202, a displacement member 203, and an abutting member 204. The displacement member 203 is inserted in an insertion hole 205 formed in a penetrating manner in the second holder member 42, and has its left end tip section projecting into the pilot chamber 52. The abutting member 204 is attached to this left end tip section.

The flow rate adjustment display section 202 serves also as an operation mechanism for adjusting a projecting amount of the displacement member 203 inside the pilot chamber 52, and thereby restricting displacement of the valve main body 44, in other words, the opening degree of the diaphragm valve 40. This flow rate adjustment display section 202 includes a casing 206 housing the operation mechanism, and a knob 208 rotatably attached to the casing 206. The casing 206 is configured to be attachable and detachable to and from the second holder member 42.

As shown in FIG. 8, the casing 206 includes a first case 210 and a second case 212 that are separable. Of these, the second case 212 is formed in a dome shape so as to have an internal space of a certain capacity in a state where fitted to the first case 210. An end section facing the first case 210, of the second case 212 is an opening whose inner diameter is comparatively large, and a right end section of the first case 210 is inserted into this opening. In addition, a plurality of (for example, four) anchoring holes 214 are formed at equal intervals in a side surface of the second case 212 (refer to FIG. 9). A fitting hook 216 formed in a projecting manner on a side surface of the first case 210 is inserted into this anchoring hole 214. Due to insertion into the anchoring hole 214 of this fitting hook 216, the first case 210 and the second case 212 are coupled.

A display window 220 is formed in the side surface of the second case 212. The knob 208 functions as an operation section that, by being operated to rotate relatively to the casing 206 by the operator, adjusts the flow rate of fluid in the air blow gun 200. A change in flow rate of the fluid (that is, a rotation amount of the knob 208) is displayed as a numerical value in the display window 220.

As shown in FIG. 8, the knob 208 is formed in a shape of a bottomed cylinder whose rightward side functions as its bottom section, and has formed at a center of its bottom section within the cylinder a cylindrically shaped fitting section 222 that extends out leftwards. A rotation transmitting member 224 is fitted into the fitting section 222. An inner circumferential surface of the fitting section 222 (female) and an outer circumferential surface of the rotation transmitting member 224 (male) have a structure where the knob 208 is displaceable in left-right directions, and fitting occurs at a position of the knob 208 displaced to a left side. In a fitted state, a rotating force of the knob 208 is smoothly transmitted to the rotation transmitting member 224.

The rotation transmitting member 224 is a member for operating displacement of the displacement member 203 and the abutting member 204, and is formed with a certain length. This rotation transmitting member 224 includes: a tubular section 226 of hollow cylindrical shape; and a columnar section 228 extending rightwards from an end surface of the tubular section 226.

A hollow inside of the tubular section 226 is formed along its axis direction as a space section 231 in which a shaft section 230 of the displacement member 203 can advance and retract. A female screw thread section is formed in an inner circumferential wall of the space section 231, and a male screw thread section formed on a side circumferential wall of the shaft section 230 of the displacement member 203 is screw-engaged with this female screw thread section.

The columnar section 228 is formed in a shape of a cylindrical column whose outer diameter is smaller than that of the tubular section 226, and the columnar section 228 extends rightwards passing along an inside of the casing 206, and has its right end section coupled to the knob 208.

The displacement member 203 is a solid circular rod-shaped member extending along the left-right direction. This displacement member 203 includes a coupling end section 232 and the shaft section 230. The abutting member 204 is provided on an end surface of the coupling end section 232 of these sections, and is capable of abutting on an end surface of the valve main body 44.

The shaft section 230 is formed with a certain length along the axis direction, and, as described above, has its side wall provided with the male screw thread section. This male screw thread section is screw-engaged into a female screw thread section of an inner surface of the rotation transmitting member 224 (a displacement operation section) extending out toward the shaft section 230. Therefore, when the rotation transmitting member 224 is rotated, the displacement member 203 including the shaft section 230 can be moved so as to advance and retract (can be displaced) along the left-right directions.

In addition to the above-mentioned casing 206, knob 208, and rotation transmitting member 224, the flow rate adjustment display section 202 comprises a display ring 234 which is provided on an inside of the casing 206.

The display ring 234 is housed in a rotatable manner inside the dome-shaped second case 212. The above-mentioned display window 220 is formed in the side surface of the second case 212, and a scale 236 of the display ring 234 is configured to be visually recognizable from this display window 220.

The second case 212 includes a tubular projection 238 having a certain inner diameter. This projection 238 is inserted inside the knob 208, and supports the knob 208 in a rotatable manner. An outer circumferential surface of the projection 238 has a knob rotation restricting section 240 in its right end section. A first annular projection 242 and second annular projection 244 are further formed on a left side of the knob rotation restricting section 240. An inwardly projecting section 208a of a left end section of the knob 208 is configured to engage in stages with the first and second annular projections 242, 244.

An outer circumferential surface of a wall section of the knob 208 surrounding the fitting section 222 has formed thereon a plurality of projecting strips 208b, so as to enable it to be easily gripped by the operator. Moreover, an inner circumferential surface right end section of the wall section is provided with an abutting section 246 on which the knob rotation restricting section 240 abuts, and an inner circumferential surface left end section of the wall section is provided with the inwardly projecting section 208a that projects inwardly in a radial direction.

The knob 208 is switched between a rotation-enabled state and a rotation-prevented state by its left-right position with respect to the projection 238. That is, in a state where the knob 208 is in a leftward position and the inwardly projecting section 208a catches on the second annular projection 244 of the projection 238, the abutting section 246 of the knob 208 ends up abutting on the knob rotation restricting section 240, and rotation is restricted. When the knob 208 undergoes rotation operation, the inwardly projecting section 208a is raised rightwards so as to ride over the second annular projection 244, so that abutting of the abutting section 246 and the knob rotation restricting section 240 is released. As a result, the knob 208 becomes rotatable relative to the second case 212.

The display ring 234 is formed in an annular shape having a hole section 248 through which the rotation transmitting member 224 is inserted. This display ring 234 is arranged, by using a spacer 250, with its rotational center offset with respect to an insertion position of the rotation transmitting member 224. Moreover, the display ring 234 has its outer circumferential surface side that is formed in an inclined tapered surface, and this tapered surface has printed thereon the scale 236 displaying the change in flow rate of the fluid. The scale 236 faces the display window 220. Therefore, the scale 236 is clearly visually recognized by the operator.

In a disposed state of the display ring 234, the rotation transmitting member 224 is inserted through an inside of the hole section 248. An unillustrated inscribed toothed section is formed in the display ring 234, and an unillustrated pair of meshing sections are formed in an outer circumferential surface of the rotation transmitting member 224. The display ring 234 undergoes rotation operation only when the meshing sections are engaged (meshed) with the inscribed toothed section.

In the air blow gun 200 configured in this way, in the case where flow rate control is required for pressurized fluid flowing along its inside, the operator grips the knob 208 to pull it rightwards. As a result, the inwardly projecting section 208a of the lower end section of the knob 208 engages with the first annular projection 242, and a state of the meshing sections having engaged with the inscribed toothed section is attained. Then, the operator rotates the knob 208, whereby the rotation transmitting member 224 and the display ring 234 rotate. Following rotation of the rotation transmitting member 224, the displacement member 203 moves leftwards or rightwards along the space section 231 of the tubular section 226, while rotating. Following this, the abutting member 204 moves leftwards or rightwards along the inside of the pilot chamber 52.

A position of the abutting member 204 can be comprehended by the scale 236 of the display ring 234. That is, when, for example, the operator wants to increase the flow rate of pressurized fluid in the air blow gun 200 correspondingly to a numerical figure of the scale 236, a setting should be made such that the displacement member 203 and the abutting member 204 move rightwards as the numerical figure of the scale 236 gets larger.

When the scale 236 has displayed a certain value, the operator stops rotation of the knob 208. Furthermore, the operator pushes in the knob 208, and achieves a state where the inwardly projecting section 208a of the lower end section of the knob 208 is engaged with the second annular projection 244 and engagement of the meshing sections and the inscribed toothed section is released. As a result, the knob 208 is locked to thereby become unable to rotate, and the displacement member 203 and the abutting member 204 become unable to be displaced. Thus, the inwardly projecting section 208a and the second annular projection 244 function as a lock unit.

Similarly to in the first embodiment, merely by compressed air being introduced into the pilot chamber 52 and the valve housing hole 54 (the small hole 56), internal pressure of compressed air in the valve chamber 34 and internal pressure of compressed air in the pilot chamber 52 are in balance, so that the diaphragm valve 40 maintains a closed state. Hence, communication of the discharge path 36 with the first supply path 22, storage chamber 32, and second supply path 30, is blocked.

When performing cleaning work, or the like, by air blow, the operator grips the handle 16 and the lever 14 such that the handle 16 is covered by their palm and the lever 14 is covered by their fingers, and, next, pivotally turns the lever 14 about the screw-for-pivoting such that the lower end of the lever 14 approaches the handle 16.

At this time, the pressing projection 72 formed projecting on the upper end surface of the lever 14 presses a lower side of the piston section 80 of the pressing rod 78. Therefore, the piston section 80 of the pressing rod 78 rises along the inside of the piston sliding hole 74, and the poppet valve 92 rises integrally therewith. Due to this rise, the blocking seal 98 separates from the piston sliding hole 74, and, as a result, the second pilot passage 58 communicates with the discharge path 36 via the small hole 56, the piston sliding hole 74, and the communicating path 76.

Therefore, compressed air in the second pilot passage 58 and the pilot chamber 52 flows to and along the discharge path 36, and is discharged from the discharge port. Thus, by the poppet valve 92 being opened, the pilot chamber 52 opens. Hence, the internal pressure in the pilot chamber 52 becomes smaller than the internal pressure of the valve chamber 34.

Moreover, the valve main body 44 of the diaphragm valve 40 is pressed by the compressed air in the valve chamber 34, and promptly separates from the valve seat 39. That is, the diaphragm valve 40 promptly opens.

Figure 10:
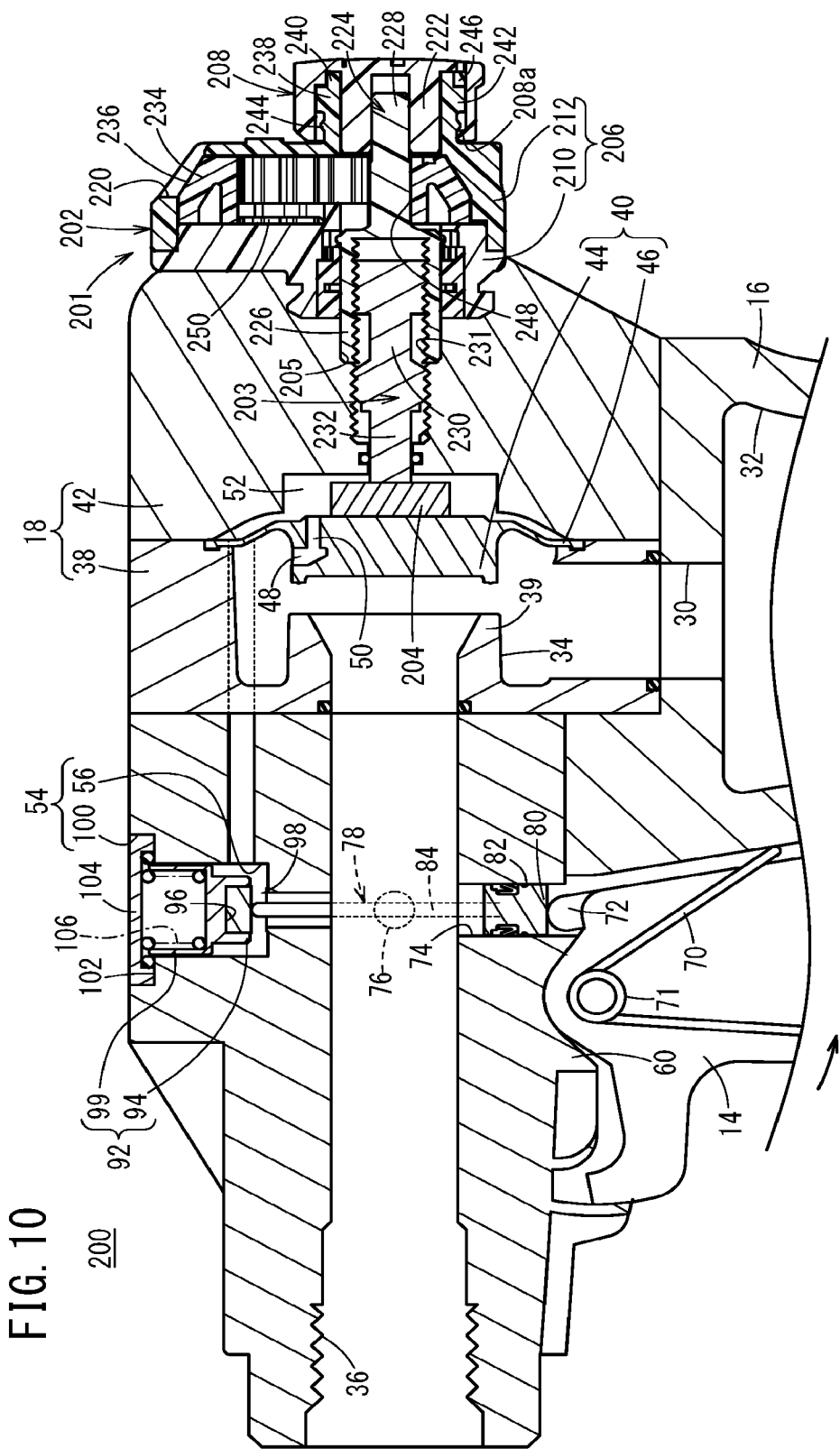
FIG. 10 is an enlarged side cross-sectional view of main part showing a state where a diaphragm valve configuring the air blow gun of FIG. 8 has opened, so that a supply path and storage chamber have communicated with a discharge path.

Displacement in a direction of separating from the valve seat 39 of the valve main body 44 stops by an end surface of the valve main body 44 abutting on the abutting member 204, as shown in FIG. 10. That is, further displacement of the valve main body 44 is prevented by the abutting member 204. Hence, a separation distance of the valve main body 44 and the valve seat 39, in other words, the opening degree of the diaphragm valve 40 is determined. Compressed air that has flowed from inside the storage chamber 32 and compressed air that has been delivered from the pilot chamber 52 are led out from the discharge path 36 with a flow rate commensurate with this opening degree.

The position of the displacement member 203 and the abutting member 204 are changed by rotating the knob 208. The larger a projecting amount to the inside of the pilot chamber 52, of the abutting member 204 is, the smaller the displacement amount of the valve main body 44, and the smaller the opening degree of the diaphragm valve 40 become. Thus, the flow rate, that is, the discharge amount of compressed air becomes smaller. Contrarily, the smaller the projecting amount of the abutting member 204 becomes, the larger the displacement amount of the valve main body 44 and the degree of opening of the diaphragm valve 40 become, and thus the flow rate, that is, the discharge amount of compressed air becomes larger.

As may be understood from this, the opening degree of the diaphragm valve 40 and the discharge amount of the compressed air are determined by an abutting position of the abutting member 204 on the valve main body 44. That is, the maximum flow rate and peak pressure of the compressed air are controlled by the flow rate control device 201.

The projecting amount of the abutting member 204 can be finely altered by rotating the knob 208. It is therefore possible to minutely change the maximum flow rate of compressed air led out from the discharge path 36. That is, the discharge amount and peak pressure of the compressed air can be finely restricted. It is therefore possible to avoid a situation that an excessive amount of discharge occurs from the air blow gun 200. Moreover, by setting a displacement amount, in other words, a stroke of the diaphragm valve 40 small, the response speed can be made even quicker.

Moreover, similarly to in the first embodiment, by appropriately changing the capacity of the storage chamber 32, the upper limit of peak pressure can be set according to an intended use, and it is possible to avoid a situation that compressed air is discharged at an excessively high pressure.

It goes without saying that in this third embodiment also, similar operational advantages to those of the first embodiment can be obtained.

Thereafter, similarly to in the first embodiment, by the operator reducing their gripping force on the lever 14, the blocking seal 98 blocks the upper opening of the piston sliding hole 74, and blow thereby ends.

Figure 11:
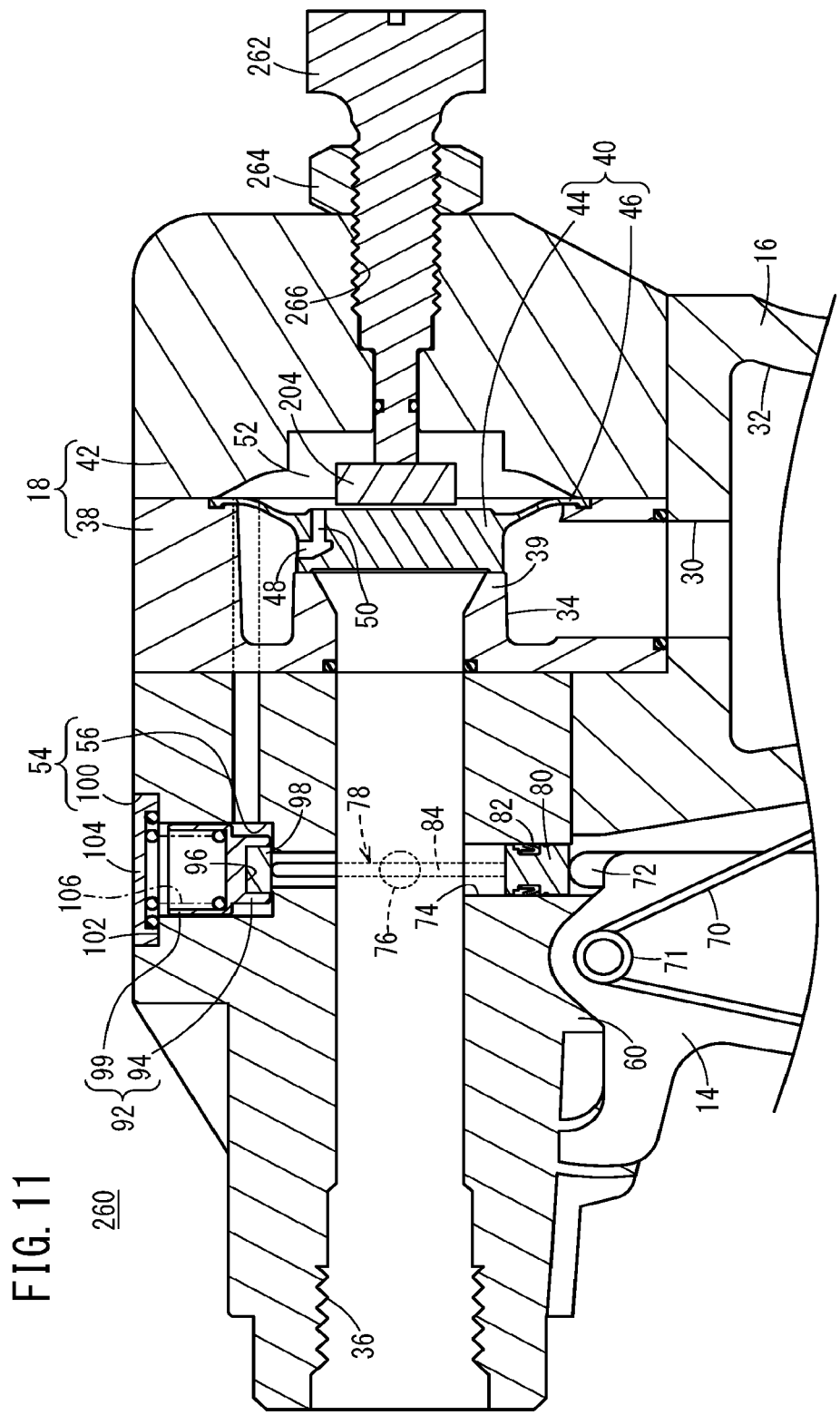
FIG. 11 is an enlarged side cross-sectional view of an air blow gun (a compressed fluid discharge control device) according to a fourth embodiment of the present invention.

Next, an air blow gun 260 according to a fourth embodiment will be described with reference to FIG. 11. This air blow gun 260 includes a screw 262 as a displacement member configuring a displacement amount restricting unit (a flow rate control section). Note that the screw 262 has a nut 264 screwed onto its male screw thread section, and has the abutting member 204 provided to its leftward tip.

In this air blow gun 260, a screw hole 266 is formed in the second holder member 42, and the male screw thread section of the screw 262 is inserted into and screwed in the screw hole 266. Moreover, the nut 264 is fastened to the screw 262 that has reached a certain depth in the screw hole 266. This fastening results in the screw 262 being positioned and fixed. That is, in this case, the nut 264 functions as a lock unit for preventing the screw 262 from being displaced.

In this case also, the displacement amount of the valve main body 44 until it abuts on the abutting member 204, and consequently, the opening degree of the diaphragm valve 40 are determined by a magnitude of the projecting amount into the pilot chamber 52, of the screw 262. That is, the discharge amount and peak pressure of the compressed air discharged via the discharge path 36 are controlled.

The present invention is not specifically limited to the above-described first through fourth embodiments, and a variety of modifications are possible within a range not departing from the scope of the present invention.

For example, a configuration may be adopted such that compressed nitrogen, or the like, is used substituting for the compressed air, and other compressed fluids may also be used. Moreover, the compressed fluid discharge control device is not limited to being a gun-shaped type such as the air blow guns 10, 150, 200, 260, but may be another type.

The invention claimed is:

1. A compressed fluid discharge control device for controlling discharge of a compressed fluid,
   the compressed fluid discharge control device including formed therein a valve chamber, the valve chamber being interposed between a supply path configured to supply the compressed fluid and a discharge path having a discharge port configured to discharge the compressed fluid, the valve chamber being provided with a valve seat,
   the compressed fluid discharge control device including:
   a diaphragm valve configured to, by seating on or separating from the valve seat, block or establish communication between the supply path and the discharge path, the diaphragm valve including a pilot passage formed therein;
   a pilot chamber into which the compressed fluid is introduced via the pilot passage from the supply path;
   a pilot chamber opening and closing valve provided to open or close the pilot chamber; and
   an opening and closing operation member selectively positionable at an opening position to open the pilot chamber opening and closing valve,
   wherein the pilot chamber opening and closing valve is open at all times when the opening and closing operation member is at the opening position, and wherein, by the pilot chamber opening and closing valve being opened to thereby open the pilot chamber, the diaphragm valve separates from the valve seat to thereby establish communication between the supply path and the discharge path, and
   when the pilot chamber opening and closing valve is closed, or when supply of the compressed fluid from the supply path is stopped, the diaphragm valve seats on the valve seat to thereby close the pilot chamber and then communication between the supply path and the discharge path is blocked.

2. The compressed fluid discharge control device according to claim 1, wherein a storage chamber configured to store the compressed fluid is interposed between the supply path and the valve chamber.

3. The compressed fluid discharge control device according to claim 2, further including a flow rate adjusting valve configured to adjust a flow rate of the compressed fluid that is introduced into the storage chamber from the supply path.

4. The compressed fluid discharge control device according to claim 2, further including a flow rate changing valve configured to change an inflow rate of the compressed fluid to the storage chamber by changing an opening degree of the supply path by a valve section.

5. The compressed fluid discharge control device according to claim 1, further including a housing that has Ruined therein the valve chamber, the pilot chamber, and the discharge path, and that is provided with the diaphragm valve and the pilot chamber opening and closing valve,
   wherein the opening and closing operation member is a lever.

6. The compressed fluid discharge control device according to claim 1, wherein the pilot chamber opening and closing valve establishes or blocks communication between the pilot chamber and the discharge path.

7. The compressed fluid discharge control device according to claim 1, further including:
   a pressing member configured to press the pilot chamber opening and closing valve in an opening direction when the opening and closing operation member has been operated; and
   an elastic member configured to elastically bias the pressing member in a closing direction of the pilot chamber opening and closing valve.

8. The compressed fluid discharge control device according to claim 1, further including a displacement amount restricting unit including an abutting member configured to be displaceable relative to the diaphragm valve, the displacement amount restricting unit being configured to, by the abutting member abutting on the diaphragm valve, restrict displacement of the diaphragm valve.

9. The compressed fluid discharge control device according to claim 8, further including a lock unit configured to position and fix the abutting member.

* * * * *